United States Patent
Lim et al.

(10) Patent No.: US 7,289,618 B2
(45) Date of Patent: Oct. 30, 2007

(54) METHOD FOR PERFORMING EXTERNAL CALL FORWARDING BETWEEN INTERNET AND TELEPHONE NETWORK IN WEB-PHONE SYSTEM

(75) Inventors: Jung-Ouk Lim, Suwon-shi (KR);
Hak-Joong Choi, Suwon-shi (KR);
Yong-Sang Lee, Suwon-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 786 days.

(21) Appl. No.: 10/214,095

(22) Filed: Aug. 8, 2002

(65) Prior Publication Data

US 2004/0028205 A1 Feb. 12, 2004

(51) Int. Cl.
*H04M 3/42* (2006.01)
(52) U.S. Cl. .............................. 379/211.01; 379/88.17
(58) Field of Classification Search ........... 379/211.01, 379/211.02, 88.17
See application file for complete search history.

(56) References Cited

U.S. PATENT DOCUMENTS

| | | | |
|---|---|---|---|
| 5,467,390 A | | 11/1995 | Brankley et al. |
| 5,583,564 A | * | 12/1996 | Rao et al. ................ 348/14.01 |
| 5,940,598 A | | 8/1999 | Strauss et al. |
| 6,014,379 A | | 1/2000 | White et al. |
| 6,028,917 A | * | 2/2000 | Creamer et al. ....... 379/100.01 |
| 6,046,762 A | | 4/2000 | Sonesh et al. |
| 6,058,169 A | * | 5/2000 | Bramnick et al. ..... 379/100.01 |
| 6,064,653 A | | 5/2000 | Farris |
| 6,125,126 A | | 9/2000 | Hallenstål |
| 6,128,379 A | | 10/2000 | Smyk |
| 6,259,692 B1 | | 7/2001 | Shtivelman et al. |
| 6,661,785 B1 | * | 12/2003 | Zhang et al. ................ 370/352 |
| 6,665,293 B2 | * | 12/2003 | Thornton et al. ........... 370/352 |
| 6,697,357 B2 | * | 2/2004 | Emerson, III ............... 370/352 |
| 6,865,266 B1 | * | 3/2005 | Pershan ................. 379/221.13 |
| 2001/0012285 A1 | | 8/2001 | Shaharabani et al. |
| 2003/0002476 A1 | * | 1/2003 | Chung et al. ............... 370/352 |

FOREIGN PATENT DOCUMENTS

| | | |
|---|---|---|
| EP | 0959593 | 11/1999 |
| GB | 2335825 | 9/1999 |
| KR | 2000-018243 | 4/2000 |
| WO | WO0139478 | 5/2001 |
| WO | WO0203714 | 1/2002 |

OTHER PUBLICATIONS

Newton's Telecom Dictionary, 8th edition, p. 180.*
"Search Report under Section 17" issued by U.K. Patent Office dated on Jan. 24, 2003.

* cited by examiner

*Primary Examiner*—Quynh H. Nguyen
(74) *Attorney, Agent, or Firm*—Robert E. Bushnell, Esq.

(57) ABSTRACT

A method for performing external call forwarding between the Internet and a telephone network in a Web-phone system. The Web-phone system has a terminal to be connected to the Internet and the telephone network. The Web-phone system allows the terminal to forward an incoming call directed to the Internet to the telephone network, or allows the terminal to forward an incoming call directed to the telephone network to the Internet. The call is forwarded for image communication as well as voice communication.

36 Claims, 6 Drawing Sheets

METHOD FOR PERFORMING EXTERNAL CALL FORWARDING BETWEEN INTERNET AND TELEPHONE NETWORK IN WEB-PHONE SYSTEM

BACKGROUND OF THE INVENTION

1. Technical Field

The present invention relates to a method for forwarding a call in a Web-phone system, and more particularly to a method for performing external call forwarding between the Internet and a telephone network in a Web-phone system.

2. Related Art

As multimedia services become popularized, a large quantity of information can be obtained from the Internet and also a Web-phone makes a telephone call over the Internet available. Such a Web-phone includes a speaker, a microphone and a computer having a communication unit for connecting the Web-phone to the Internet. In a Web-phone communication service over the Internet, the Web-phone is connected to a host computer to receive directory information, that is, access addresses of calling parties and called parties over a plurality of private information providers, so that the calling parties and the called parties can be connected.

The Korean patent laid-open publication No. 2000-0018243 discloses a technique of forwarding an incoming call directed to the Internet to a telephone network and forwarding an incoming call directed to the telephone network to the Internet in a Web-phone or Internet-phone system.

The Korean patent laid-open publication No. 2000-0037646 discloses a technique of using both general telephone and Internet calls with a phone book storing telephone numbers to select a general office line network and the Internet when a general telephone is connected to a Web-phone module.

The U.S. Pat. No. 6,125,126, issued to Hallenstal and entitled METHOD AND APPARATUS FOR SELECTIVE CALL FORWARDING, discloses a method and apparatus for selective call forwarding. However, in the techniques described above, all the calling and called parties of the Web-phone system should be connected to the Internet.

Thus, if all the calling and called parties of the Web-phone or Internet phone system are not connected to the Internet, the Web-phone or Internet-phone system cannot receive and transmit the call from and to a public switched telephone network (PSTN) and an integrated services digital network (ISDN).

Exemplars of recent efforts related to data transmission and telephone transmission include U.S. Pat. No. 6,259,692 to Shtivelman et al., entitled INTERNET CALL WAITING, issued on Jul. 10, 2001, U.S. Pat. No. 5,467,390 to Brankley et al., entitled DATA TRANSMISSION VIA A PUBLIC SWITCHED TELEPHONE NETWORK, issued on Nov. 14, 1995, U.S. Pat. No. 5,940,598 to Strauss et al., entitled TELECOMMUNICATIONS NETWORK TO INTERNETWORK UNIVERSAL SERVER, issued on Aug. 17, 1999, U.S. Pat. No. 6,014,379 to White et al., entitled TELECOMMUNICATIONS CUSTOM CALLING SERVICES, issued on Jan. 11, 2000, U.S. Pat. No. 6,046,762 to Sonesh et al., entitled MULTIMEDIA TELECOMMUNICATION AUTOMATIC ALL DISTRIBUTION SYSTEM, issued on Apr. 4, 2000, U.S. Pat. No. 6,064,653 to Farris, entitled INTERNETWORK GATEWAY TO GATEWAY ALTERNATIVE COMMUNICATION, issued on May 16, 2000, and U.S. Pat. No. 6,128,379 to Smyk, entitled INTELLIGENT DATA PERIPHERAL SYSTEMS AND METHODS, issued on Oct. 3, 2000.

While these recent efforts provide advantages, we note that they fail to adequately provide a method for efficiently and conveniently performing external call forwarding between the Internet and a telephone network in a Web-phone system.

SUMMARY OF THE INVENTION

The present invention has been made in view of the above problems, and it is an object of the present invention to provide a method of receiving an incoming call directed to the Internet and then forwarding that call to a telephone network, where a terminal such as a telephone is connected to the Internet and the telephone network, so that an international call and a long-distance call can be inexpensively performed It is a further object of the present invention to provide a method of receiving an incoming call directed to a telephone network and then forwarding that call to the Internet, where a terminal such as a telephone is connected to the Internet and the telephone network, so that an international call and a long-distance call can be inexpensively performed.

It is another object of the present invention to provide a method capable of switching a communication mode to an image communication mode as well as a voice communication mode.

In accordance with one aspect of the present invention, the above and other object can be accomplished by the provision of a method for performing external call forwarding between the Internet and a telephone network, comprising the steps of (a) determining in a call non-connection state whether an incoming call has to be externally forwarded, carrying out a general call process if the incoming call does not have to be externally forwarded, checking a type of a line for the external call forwarding if the incoming call has to be externally forwarded, and determining whether the telephone network is available for the external call forwarding; (b) messaging an error if the telephone network is not available for the external call forwarding at the step (a), receiving a telephone number of a called party from a calling party if the telephone network is available for the external call forwarding at the step (a), and determining whether a speech path is established by dialing the telephone number; (c) messaging the error if the speech path is not established by dialing the telephone number at the step (b), establishing the speech path between terminals of the calling party and the called party if the speech path is established by dialing the telephone number at the step (b), and determining whether image communication is selected; (d) switching a communication mode to an image communication mode if the image communication is selected at the step (c), maintaining an external call forwarding state, and continuing to perform the image communication until the calling or called party terminates the image communication; (e) determining in a call connection state whether a key input corresponds to an external call forwarding key, checking the type of the line for the external call forwarding if the key input corresponds to the external call forwarding key, and determining whether the telephone network is available for the external call forwarding; (f) messaging the error if the telephone network is not available for the external call forwarding at the step (e), receiving the telephone number of the called party from the calling party if the telephone network is available for the external call forwarding at the step (e), and determining whether a new speech path is established by dialing the telephone number; (g) messaging the error if the new speech path is not established by dialing the telephone number at the step (f), cutting the speech path and transmission/reception between the terminals of the calling party and the called party off if the new speech path is established by dialing the telephone number at the step (f), and establishing the new speech path between the terminals of the calling party and the called party; and (h) determining whether the image communication is selected, switching the communication mode to the image communication mode if the image communication is selected, maintaining the external call forwarding state, and continuing to perform the image communication until the calling or called party terminates the image communication.

To achieve these and other objects in accordance with the principles of the present invention, as embodied and broadly described, the present invention provides a method for perfoming external call forwarding between the Internet and a telephone network, comprising: receiving one selected from among a first incoming call and a second incoming call, the first incoming call being initially directed to the Internet, the second incoming call being initially directed to a telephone network; and forwarding the received incoming call to one selected from among the Internet and the telephone network.

To achieve these and other objects in accordance with the principles of the present invention, as embodied and broadly described, the present invention provides a method of performing call forwarding between the Internet and a telephone network, comprising: receiving an incoming call, the incoming call being initially directed to the Internet; determining whether the incoming call is to be forwarded; when the incoming call is not to be forwarded, performing a standard call process without call forwarding; when the incoming call is to be forwarded, detecting whether a telephone network is available; when the telephone network is not available, transmitting a first error message; when the telephone network is available, receiving a telephone number and dialing the telephone number and detecting whether a communication path is established; and when the communication path is not established, transmitting a second error message.

To achieve these and other objects in accordance with the principles of the present invention, as embodied and broadly described, the present invention provides a method of performing call forwarding between the Internet and a telephone network, comprising: when a first call has been connected to establish a first speech communication path, detecting a key input; determining whether the key input corresponds to a call forwarding command; when the key input corresponds to the call forwarding command, detecting whether a telephone network is available; when the telephone network is not available, transmitting a first error message; when the telephone network is available, receiving a telephone number and dialing the telephone number and detecting whether a second speech communication path is established; when the second speech communication path is not established, transmitting a second error message; and when the second speech communication path is established, cutting off the first speech communication path.

To achieve these and other objects in accordance with the principles of the present invention, as embodied and broadly described, the present invention provides a method of performing call forwarding between the Internet and a telephone network, comprising: receiving an incoming call from a calling party to a called party, said receiving of the incoming call being performed by a Web-phone system connected to the Internet and to a telephone network when the Web-phone system is in a call non-connection mode; determining whether the incoming call is to be forwarded; when the incoming call is not to be forwarded, performing a standard call process; when the incoming call is to be forwarded, detecting a type of line for the performance of the forwarding of the incoming call and detecting whether a telephone network is available; when the telephone network is not available, transmitting a first error message; when the telephone network is available, receiving a first telephone number and dialing the first telephone number and detecting whether a first speech communication path is established; when the first speech communication path is not established, transmitting a second error message; when the first speech communication path is established, determining whether an image communication mode is selected; when an image communication mode is selected, switching from speech communication mode to the image communication mode to maintain a first image communication path; when the Web-phone system is in a call connection mode and an existing communication path is being maintained, detecting a key input; determining whether the key input corresponds to a call forwarding command; when the key input corresponds to the call forwarding command, detecting a type of line for the performance of the call forwarding command and detecting whether the telephone network is available; when the telephone network is not available, transmitting a third error message; when the telephone network is available, receiving a second telephone number and dialing the second telephone number and detecting whether a new speech communication path is established; when the new speech communication path is not established, transmitting a fourth error message; when the new speech communication path is established, cutting off the existing communication path.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENTS

Figure 1:
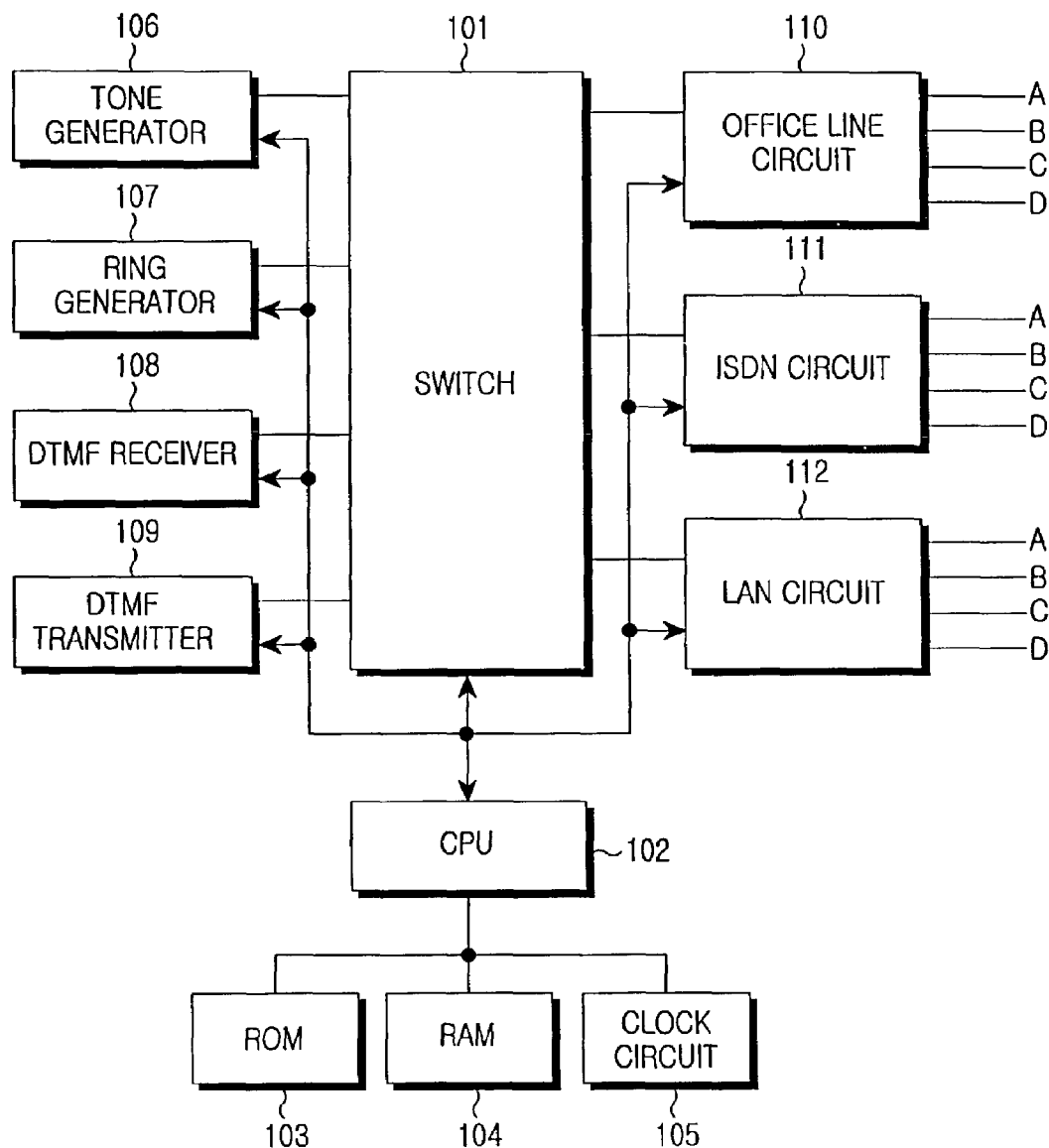
FIG. 1 is a view roughly illustrating a Web-phone system, in accordance with the principles of the present invention.

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. In the following description, well-known functions, constructions, and configurations are not described in detail since they could obscure the invention with unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Now, preferred embodiments of the present invention will be described in detail with reference to the annexed drawings. In the drawings, the same or similar elements are denoted by the same reference numerals even though they are depicted in different drawings.

In the following description made in conjunction with preferred embodiments of the present invention, a variety of specific elements such as constituting elements of various concrete circuits are shown. The description of such elements has been made only for a better understanding of the present invention. Those skilled in the art will appreciate that the present invention can be implemented without using the above-mentioned specific elements. Also, in the following description, a detailed description of known functions and configurations incorporated herein will be omitted when it may cause the subject matter of the present invention to become less clear.

FIG. 1 is a view roughly illustrating a Web-phone system, in accordance with the principles of the present invention. With reference to FIG. 1, the Web-phone system includes an office line and integrated services digital network (ISDN) circuits 110 and 111, a local area network (LAN) circuit 112, tone and ring generators 106 and 107, a dual tone multi-frequency (DTMF) transmitter 109, a DTMF receiver 108, a read only memory (ROM) 103, a random access memory (RAM) 104, a central processing unit (CPU) 102 and a switch 101. The office line and ISDN circuits 110 and 111 are connected to a public telephone network. The local area network circuit 112 is connected to the Internet. The tone and ring generators 106 and 107 generate a tone and a ring for calling. The dual tone multi-frequency (DTMF) transmitter and receiver 109 and 108 provide a dual tone multi-frequency (DTMF) signal. The read only memory (ROM) 103 and the random access memory (RAM) 104 store Web-phone data. The central processing unit 102 controls image communication.

The switch 101 switches an incoming call for the image communication to the public telephone network which is coupled to the office line circuit 110 and integrated services digital network (ISDN) circuit 111, and switches an incoming call for the image communication to the Internet coupled to the local area network circuit 112. The switch 101 is a virtual switch, which can support the image communication by connecting the central processing unit 102, the office line and ISDN circuits 110 and 111 and the local area network circuit 112 to one another, rather than a hardware or physical element.

Figure 2:
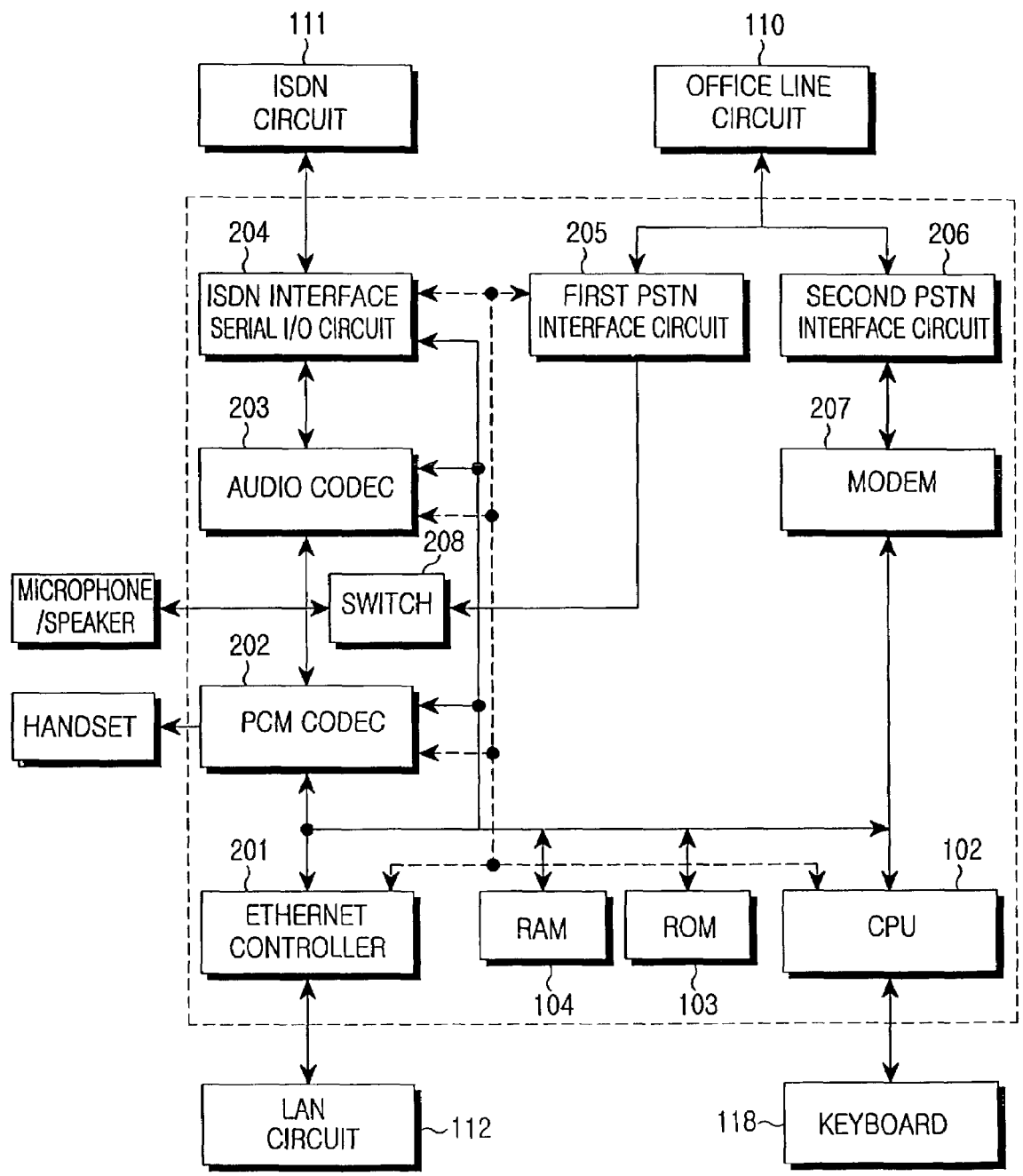
FIG. 2 is a view illustrating in detail an interior of the Web-phone system shown in FIG. 1.

FIG. 2 is a view illustrating in detail an interior of the Web-phone system shown in FIG. 1. In the Web-phone system as shown in FIG. 2, an Ethernet controller 201 is connected to the local area network (LAN) circuit 112, which is connected to the Internet (or LAN). An integrated services digital network (ISDN) interface serial input/output (I/O) circuit 204 is connected to the ISDN circuit 111. First and second public switched telephone network (PSTN) interface circuits 205 and 206 are connected to the office line circuit 110. An audio coder-decoder (CODEC) 203 codes or decodes input and output data of the ISDN interface serial I/O circuit 204 into audio data. Further, the audio coder-decoder (CODEC) 203 uses International Telecommunications Union-T (ITU-T) recommendation H.323 to process data to be received and transmitted. The H.323 recommendation is a recommendation published by the ITU which serves to define the interworking of elements and protocols to allow multimedia transmission through a packet-based network.

The audio coder-decoder (CODEC) 203 converts digital data, which is to be transmitted from the Internet to the telephone network, into analog data. A pulse code modulation (PCM) CODEC 202 codes or decodes data from the audio CODEC 203 and the Ethernet controller 201 into pulse code modulation (PCM) data to output the coded or decoded pulse code modulation (PCM) data to a handset. The central processing unit 102 controls the first and second public switched telephone network (PSTN) interface circuits 205 and 206, the integrated services digital network (ISDN) interface serial input/output (I/O) circuit 204 and the Ethernet controller 201 by means of the data stored in the read only memory (ROM) 103 and the random access memory (RAM) 104 in order to control the image communication. A switch 208 is switched between the first PSTN interface circuit 205 and a microphone/speaker. A modem 207 processes data from the second PSTN interface circuit 206. In the Web-phone system shown in FIG. 2, a detailed view of a handset for response, a liquid crystal display (LCD) for displaying a state of the image communication, and other features are not shown.

Figure 3A:
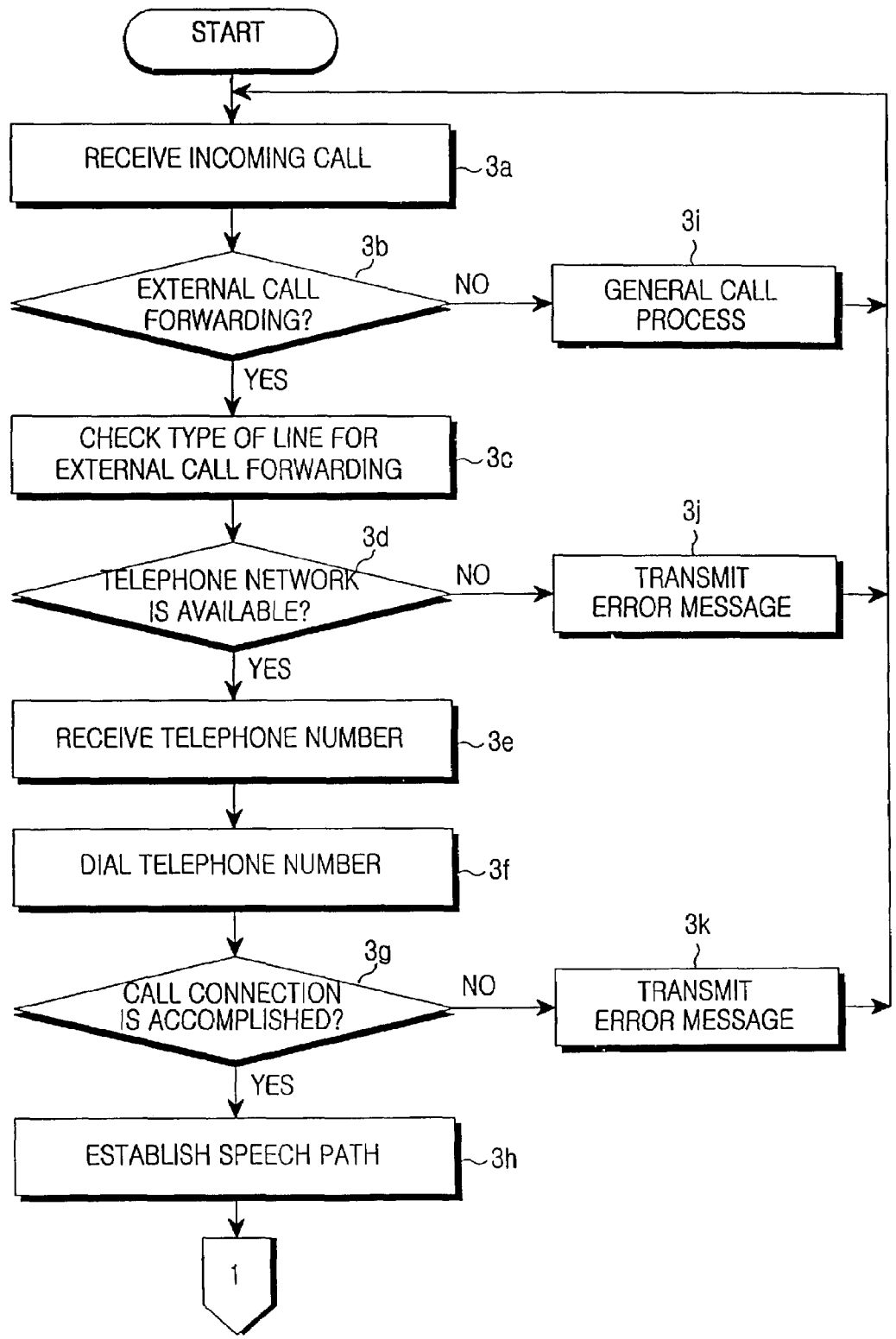
FIGS. 3A and 3B are flow charts illustrating a method for performing external call forwarding, in accordance with the principles of the present invention.
Figure 3B:
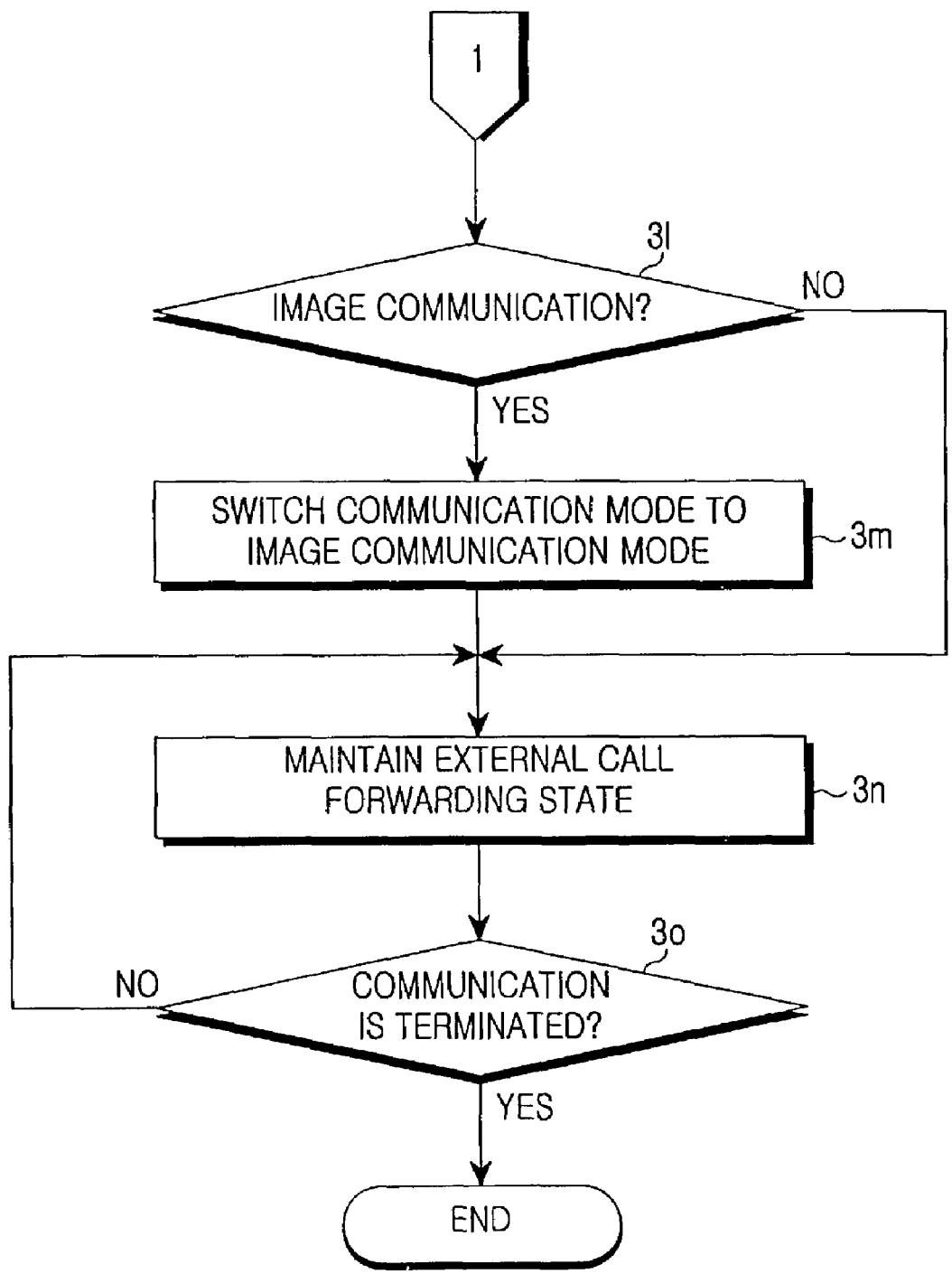

FIGS. 3A and 3B are flow charts illustrating a method for performing external call forwarding, in accordance with the principles of the present invention. With reference to FIGS. 3A and 3B, the method for performing the external call forwarding, comprises the steps of: (a) determining in a call non-connection state whether an incoming call has to be externally forwarded, carrying out a general call process if the incoming call does not have to be externally forwarded, checking a type of a line for the external call forwarding if the incoming call has to be externally forwarded, and determining whether a telephone network is available for the external call forwarding; (b) messaging an error if the telephone network is not available for the external call forwarding at the above step (a), receiving a telephone number of a called party from a calling party if the telephone network is available for the external call forwarding at the above step (a), and determining whether a speech path is established by dialing the telephone number; (c) messaging the error if the speech path is not established by dialing the telephone number at the above step (b), establishing the speech path between terminals of the calling party and the called party if the speech path is established by dialing the telephone number at the above step (b), and determining whether image communication is selected; and (d) switching a communication mode to an image communication mode if the image communication is selected at the above step (c), maintaining an external call forwarding state, and continuing to perform the image communication until the calling or called party terminates the image communication.

Figure 4A:
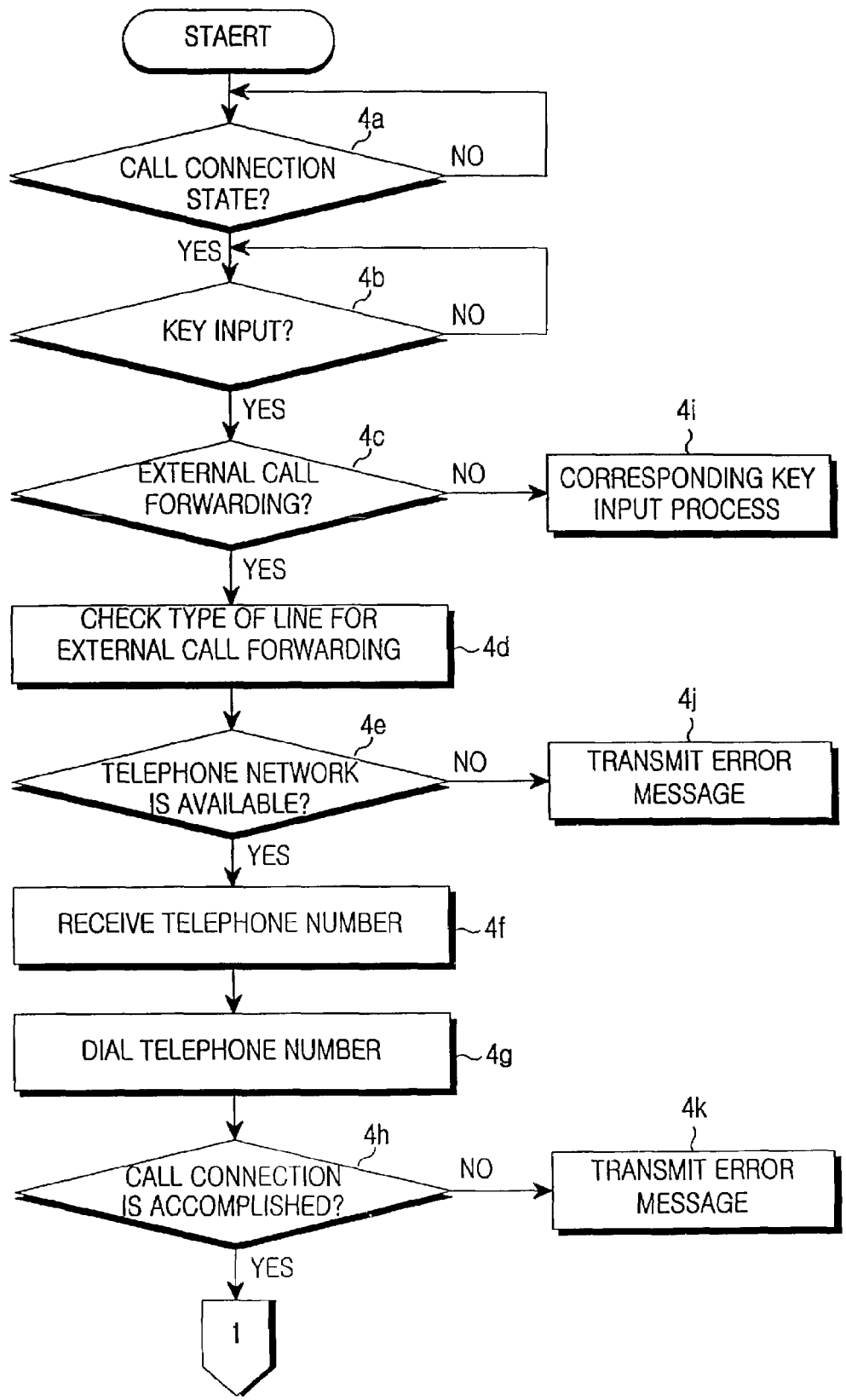
FIGS. 4A and 4B are flow charts illustrating a method for performing external call forwarding in a call connection state, in accordance with the principles of the present invention.
Figure 4B:
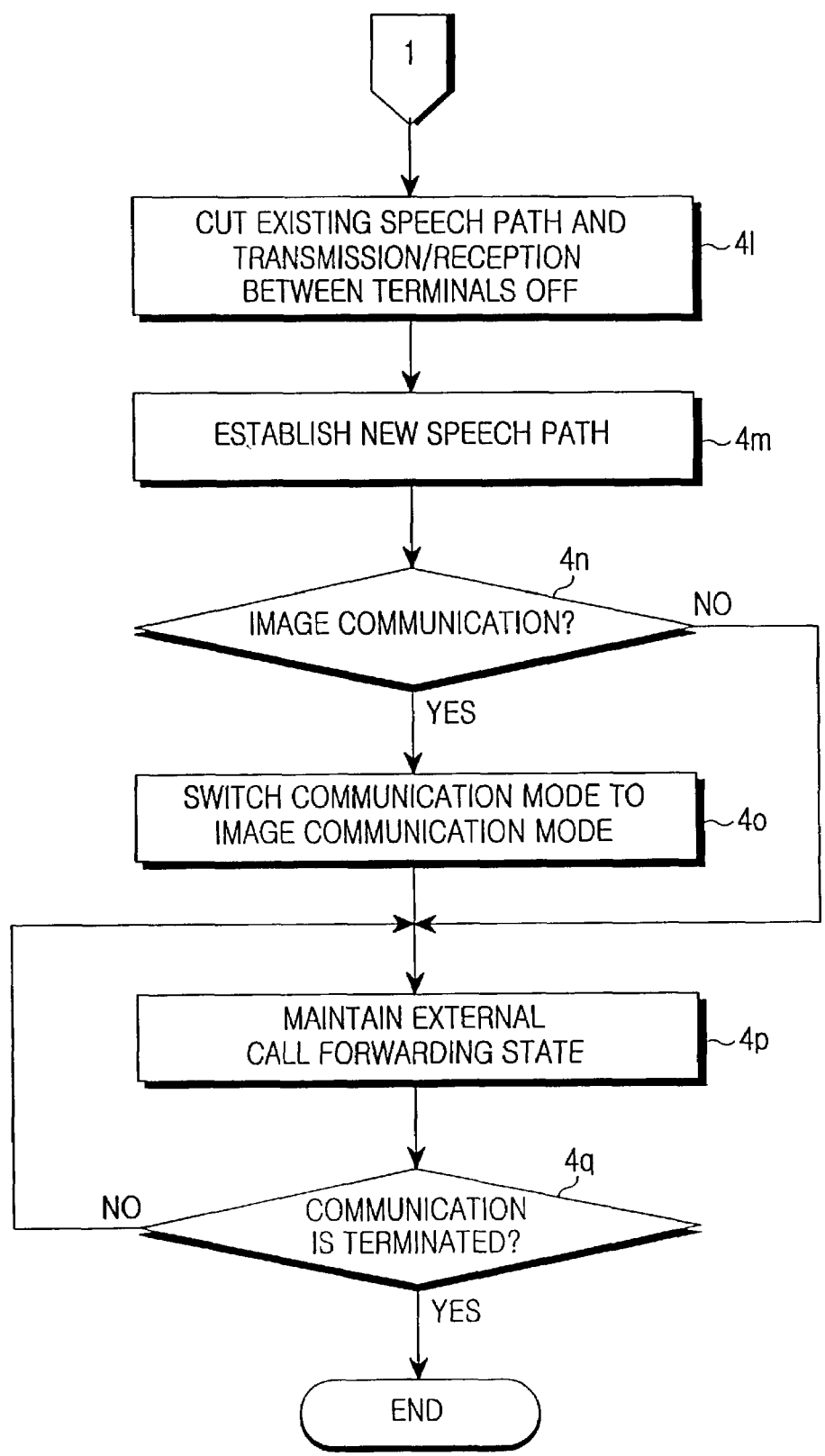

FIGS. 4A and 4B are flow charts illustrating a method for performing external call forwarding in a call connection state, in accordance with the principles of the present invention. With reference to FIGS. 4A and 4B, the method for performing the external call forwarding in the call connection state, comprises the steps of: (a) determining in the call connection state whether a key input corresponds to an external call forwarding key, checking a type of a line for the external call forwarding if the key input corresponds to the external call forwarding key, and determining whether a telephone network is available for the external call forwarding; (b) messaging an error if the telephone network is not available for the external call forwarding at the above step (a), receiving a telephone number of a called party from a calling party if the telephone network is available for the external call forwarding at the above step (a), and determining whether a new speech path is established by dialing the telephone number; (c) messaging the error if the new speech path is not established by dialing the telephone number at the above step (b), cutting an existing speech path and trans- mission/reception between terminals of the calling party and the called party off if the new speech path is established by dialing the telephone number at the above step (b); and establishing the new speech path between the terminals of the calling party and the called party; and (d) determining whether image communication is selected, switching a communication mode to an image communication mode if the image communication is selected, maintaining an external call forwarding state, and continuing to perform the image communication until the calling or called party terminates the image communication.

With reference to FIGS. 1, 2, 3A, 3B, 4B and 4B, the present invention will be described in detail below. When an incoming call directed to the Internet is received through an Internet line, it is determined whether the incoming call directed to the Internet has to be externally forwarded. The determination is made based on a message of International Telecommunications Union-T recommendation Q.931. The recommendation Q.931 is a call signaling protocol used in integrated services digital network (ISDN) networks for setting up calls, and is used for establishing H.323 calls.

The message includes a setup message having external call forwarding request information, a telephone number of a called party and information indicating whether image communication is requested, the setup message being added to a user information field of the message. The setup message may be replaced with another separate message. If the incoming call directed to the Internet does not have to be externally forwarded, a general call process is carried out. Otherwise, it is determined whether the telephone number is contained in the message. Then, if the telephone number is not contained in the message, it is required that the message is again received. Otherwise, it is determined whether a telephone network is available for external call forwarding. Then, if the telephone network is not available for the external call forwarding, the general call process is carried out and a non-acknowledgement (NAK) response message for the external call forwarding is transmitted through the Internet line.

Otherwise, it is determined whether a telephone network line for the external call forwarding is selected and the telephone number of a telephone network user is dialed. At this time, a hold indication signal is transmitted to an Internet user through the Internet line. When a response message is received from the telephone network user, a speech path establishment is carried out between the Internet user and the telephone network user. It is determined from the message whether the image communication is requested and the image communication is attempted if the image communication is requested. In a call connection state, the communication is continued until the Internet user or the telephone network user terminates the communication.

Where an incoming call directed to the telephone network is forwarded to the Internet, it is determined from the message whether the external call forwarding is requested. If the external call forwarding is requested, an Internet protocol (IP) address is received. A dot "." in the IP address corresponds to a key "*" of a keyboard and an input end of the IP address corresponds to a key "#" of the keyboard. When the IP address is received, the Internet is selected to transmit the IP address to the Internet and an acknowledgement (ACK) or non-acknowledgement (NAK) response message is received. If the NAK response message is received, a general incoming call process is carried out. If the ACK response message is received, the speech path establishment is carried out between the telephone network and the Internet. On the other hand, if the external call forwarding is not requested, the general incoming call process is carried out. In the call connection state, the communication is continued until the telephone network user or the Internet user terminates the communication.

The above description shows a case where the external call forwarding is not first requested but the external call forwarding is later requested in the call connection state. When the Internet user, which is in the call connection state with the Internet line, requests the external call forwarding by selecting a key (or button) for the external call forwarding, the incoming call directed to the Internet is forwarded to the telephone network. Then, the telephone communication in progress is terminated. In other words, when the external call forwarding is requested in course of the communication between the Internet line and the telephone, the communication through the Internet line is terminated and then the external call forwarding is carried out. Similarly, the incoming call directed to the telephone network is forwarded to the Internet line by the external call-forwarding request of the telephone network user.

When the telephone is in an automatic response state, an incoming call can be forwarded to the telephone network after an automatic response message reception. In other words, the central processing unit 102 of the Web-phone system shown in FIG. 2 receives the incoming call at step 3a. Here, the central processing unit 102 checks states of the first and second public switched telephone network (PSTN) interface circuits 205 and 206 for a general call interface and the integrated services digital network (ISDN) interface serial input/output (I/O) circuit 204 for an ISDN call interface or a state of the Ethernet controller 201, and the central processing unit 102 receives the incoming call directed to the Internet. It is determined at step 3b whether the incoming call directed to the Internet has to be externally forwarded. If the incoming call directed to the Internet is not to be externally forwarded at step 3b, then a general call process occurs at step 3i.

If the incoming call directed to the Internet has to be externally forwarded at the above step 3b, a type of a line for the external call forwarding is checked at step 3c. Then, it is determined at step 3d whether the telephone network is available for the external call forwarding. If the telephone network is not available for the external call forwarding, an error message is transmitted at step 3*j*. Otherwise, the telephone number of the called party is received through a keyboard 118 at step 3*e* and the telephone number is dialed at step 3*f*. Then, it is determined at step 3*g* whether a call connection is accomplished.

If the call connection is not accomplished, the error message is transmitted at step 3*k*. Otherwise, the speech path for the external call forwarding is established at step 3*h*. The central processing unit 102 rather than a separate switching device accomplishes the speech path establishment. At this time, the central processing unit 102 checks the states of the first and second public switched telephone network (PSTN) interface circuits 205 and 206 and the integrated services digital network (ISDN) interface serial input/output (I/O) circuit 204 or controls the Ethernet controller 201 to perform the communication by the speech path establishment over the audio coder-decoder (CODEC) 203 and the pulse code modulation (PCM) CODEC 202. Then, it is determined at step 3*l* whether image communication is requested. If the image communication is requested, a communication mode is switched to an image communication mode at step 3*m*. Then, the communication is continued in the external call forwarding state at step 3*n* until the calling or called party terminates the communication at step 3*o*.

Unlike FIGS. 3A and 3B, FIGS. 4A and 4B show the external call forwarding in the call connection state. The central processing unit 102 checks the call connection state at step 4*a* and checks a key input from the keyboard 118 at step 4*b*. Then, if the key input does not correspond to an external call forwarding key at step 4*c*, a corresponding key input process is carried out at step 4*i*. Otherwise, the line for the external call forwarding is checked at step 4*d*. Then, it is determined at step 4*e* whether the telephone network is available for the external call forwarding. If the telephone network is not available for the external call forwarding, the error message is transmitted at step 4*j*. Otherwise, the telephone number of the called party is received from the keyboard 118 at step 4*f* and the telephone number is dialed at step 4*g*. Then, it is determined whether the call connection is accomplished at step 4*h*.

If the call connection is not accomplished, the error message is transmitted at step 4*k*. Otherwise, an existing speech path and transmission/reception between terminals are cut off at step 4*l* and a new speech path is established between the terminals at step 4*m*. The central processing unit 102 rather than a separate switching device accomplishes the speech path establishment. At this time, the central processing unit 102 checks the states of the first and second public switched telephone network (PSTN) interface circuits 205 and 206 and the integrated services digital network (ISDN) interface serial input/output (I/O) circuit 204 or controls the Ethernet controller 201 to perform the communication by the speech path establishment over the audio coder-decoder (CODEC) 203 and the pulse code modulation (PCM) CODEC 202. Then, it is determined at step 4*n* whether the image communication is requested. If the image communication is requested, a communication mode is switched to the image communication mode at step 4*o*. Then, the communication is continued in the external call forwarding state at step 4*p* until the calling or called party terminates the communication at step 4*q*. The external call forwarding is simultaneously serviced to a plurality of users according to circumstances.

As apparent from the above description, the present invention provides a method of forwarding an incoming call directed to the Internet to a telephone network, or forwarding an incoming call directed to the telephone network to the Internet where a terminal (telephone) is connected to the Internet and the telephone network, so that an international call and a long-distance call can be inexpensively performed. Further, the present invention provides a method capable of switching a communication mode to an image communication mode as well as a voice communication mode.

When an incoming call is in a call connection state, this can mean that a connection has been established between a calling party and a called party. After the calling party and called party are talking to each other via that connection, the method of the present invention allows the call to be forwarded to a telephone number or to an Internet address.

When an incoming call is in a call non-connection state, this can mean that a connection has not yet been established between a calling party and a called party. In the call non-connection state, the method of the present invention allows the incoming call to be forwarded to a telephone number or to an Internet address.

In accordance with the principles of the present invention, a terminal can receive an incoming call. The incoming call could be initially directed to utilize the Internet or a telephone network. The terminal can receive that incoming call regardless of whether it was initially directed to the Internet or a telephone network. After the terminal receives that incoming call, the terminal can forward it to the Internet or to a telephone network. The terminal can perform that forwarding in response to a call forwarding command such as a key input command, for example. The terminal can perform that forwarding regardless of where that incoming call originated (Internet or telephone network) and regardless of the initial intended destination of that incoming call (Internet or telephone network).

The FIGS. 3A-3B show steps relating to a situation where a call non-connection mode (or call non-connection state) exists at the START, immediately before step 3*a*. The FIGS. 4A-4B show steps relating to a situation where a call connection mode (or call connection state) exists after step 4*a*.

The error messages in steps 3*j* and 3*k* of FIG. 3A can be different from each other. The error messages in steps 4*j* and 4*k* of FIG. 4A can be different from each other.

The present invention provides a method for performing external call forwarding between the Internet and a telephone network in a Web-phone system, comprising: allowing a terminal to forward an incoming call directed to the Internet or an incoming call being in a call connection state to the telephone network, or allowing the terminal to forward an incoming call directed to the telephone network to the Internet, the Web-phone system having a transceiver for transmitting and receiving a call between the Internet and the telephone network and the terminal connected to a public switched telephone network (PSTN) and an integrated services digital network (ISDN), which are connected to the Internet and the telephone network, wherein the call is forwarded for image communication as well as voice communication, wherein the terminal receives a ring signal to make a call possible where the forwarding is impossible.

An image communication path can be a connection between a calling party and a called party allowing those parties to transmit images and other data to and from each other. When images and other data are being transmitted between the calling parties over the image communication path, the mode can be said to be an image communication mode.

A voice communication path can be a connection between a calling party and a called party allowing those parties to talk with each other. When parties are talking to each other over a speech communication path or voice communication path, the mode can be said to be a voice communication mode.

When the call forwarding cannot be performed, the Web-phone system shown in FIG. 1 can receive a ring signal, thereby allowing a call completion. A general call process or standard call process may result in a busy signal or a call completion without call forwarding. The general call process in step 3*i* in FIG. 3A can be a standard call process without call forwarding, so that the calling party contacts the called party without call forwarding.

In step 4*b* of FIG. 4A, a key can be pressed in order to indicate that a call forwarding is to be performed. The key can be a key designated for a call forwarding instruction. Thus, the key input at step 4*b* can input a call forwarding command (or instruction) to the Web-phone system. Instead of key input being received at step 4*b*, a voice command or other non-key input sound can be received, when the Web-phone system is set up to detect and respond to voice commands or special sounds.

The image communication path provided by the present invention can include image communication, voice communication, and data communication together. Thus, an image communication path can support a videophone function and an exchange of data files at about the same time, for example.

An additional embodiment of the present invention can be described with reference to FIGS. 3A-3B. The additional embodiment of the present invention can establish a generic communication path in step 3*h* instead of a speech communication path. Also, the additional embodiment will detect a selected type of communication path step 31 instead of merely determining whether an image communication path is selected. Thus, in this additional embodiment, in step 31, a user can select either an image communication path, a voice communication path, a data communication path, or some combination of those types of communication paths. In this additional embodiment, the step 3*m* would be "switch communication mode to selected mode."

The foregoing paragraphs describe the details of a method for forwarding a call in a Web-phone system, and more particularly describe the details of a method for performing external call forwarding between the Internet and a telephone network in a Web-phone system, the Web-phone system allowing a terminal connected to the Internet and the telephone network to forward an incoming call directed to the Internet to the telephone network, to forward an incoming call directed to the telephone network to the Internet, and to make voice communication and image communication available.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A method for performing external call forwarding between an Internet and a telephone network, comprising:
   receiving one call selected from among a first incoming call and a second incoming call, the first incoming call being initially directed to the Internet, the second incoming call being initially directed to a telephone network, said receiving of the first and second incoming calls being performed by a Web-phone system connected to the Internet and to the telephone network; and
   forwarding the received incoming call to one network selected from among the Internet and the telephone network;
   said method further comprising the steps of:
      determining whether the received incoming call is to be forwarded;
      when it is determined that the received incoming call is to be forwarded,
      requesting and receiving a telephone number of a called party from a calling party, said received telephone number of the called party not having been included in the incoming call; and
      when it is determined that the received incoming call is not to be forwarded, proceeding with a standard call.

2. The method of claim 1, the Web-phone system being connected to the telephone network and the Internet.

3. The method of claim 2, the telephone network corresponding to at least one network selected from among a public switched telephone network and an integrated services digital network.

4. The method of claim 2, the Web-phone system connecting to the telephone network through at least one circuit selected from among an office line circuit and an integrated services digital network circuit.

5. The method of claim 2, said forwarding being performed to establish at least one path selected from among an image communication path and a voice communication path.

6. The method of claim 2, further comprising:
   receiving a ring signal at the Web-phone system when said forwarding cannot be performed.

7. The method of claim 1, said forwarding being performed to establish at least one path selected from among an image communication path and a voice communication path.

8. The method of claim 1, further comprising:
   receiving a ring signal at the Web-phone system when said forwarding cannot be performed.

9. A method of performing call forwarding between an Internet and a telephone network, comprising:
   receiving an incoming call, the incoming call being initially directed to the Internet, said receiving of the incoming call being performed by a Web-phone system connected to the Internet and to the telephone network;
   determining whether the incoming call is to be forwarded;
   when the incoming call is not to be forwarded, performing a standard call process without call forwarding;
   when the incoming call is to be forwarded, detecting whether a telephone network is available;
   when the telephone network is not available, transmitting a first error message;
   when the telephone network is available, requesting and receiving a telephone number of a called party from a calling party and dialing the telephone number and detecting whether a communication path is established;

said received telephone number of the called party not having been included in the incoming call;
when the communication path is not established, transmitting a second error message; and
when the communication path is established, using the received telephone number and the established communication path to forward the incoming call to the called party.

10. The method of claim 9, further comprising:
when the communication path is established, determining whether an image communication mode is selected; and
when an image communication mode is selected, switching from a speech communication mode to the image communication mode, the communication path being initially set to the speech communication mode.

11. The method of claim 9, further comrising:
when the communication path is established, determining a selected communication mode;
when the selected communication mode is an image communication mode, setting the image communication mode; and
when the selected communication mode is a speech communication mode, setting the speech communication mode.

12. The method of claim 10, said receiving of the incoming call, said receiving of the telephone number, said dialing of the telephone number, and said detecting whether a speech communication path is established all being performed by the Web-phone system, the Web-phone system being connected to the Internet and to the telephone network.

13. The method of claim 12, said receiving of the incoming call being performed when the Web-phone system is in a call non-connection mode.

14. The method of claim 12, further comprising:
when the incoming call is to be forwarded, detecting a type of line for the performance of the forwarding, said type of line being detected before said detecting of whether the telephone network is available.

15. The method of claim 9, further comprising:
maintaining the communication path until one party selected from among the calling party and the called party terminates the communication path.

16. A method of performing call forwarding between an Internet and a telephone network, comprising:
receiving an incoming call by a Web-phone system connected to the Internet and to the telephone network;
when a first call has been connected to establish a first speech communication path, detecting a key input;
determining whether the key input corresponds to a call forwarding command
when the key input corresponds to the call forwarding command, detecting whether a telephone network is available;
when the telephone network is not available, transmitting a first error message;
when the telephone network is available, reguesting and receiving a telephone number of a called party from a calling party, dialing the telephone number, and detecting whether a second speech communication path is established, said received telephone number of the called party not having been included in the incoming call;
when the second speech communication path is not established, transmitting a second error message; and
when the second speech communication path is established, cutting off the first speech communication path and using the received telephone number and the second speed communication path to forward the incoming call to the called party.

17. The method of claim 16, the first speech communication path being established through the Internet.

18. The method of claim 16, said cutting off of the first speech communication path corresponding to disconnecting the first speech path between a terminal of the called party and a terminal of the calling party.

19. The method of claim 16, further comprising maintaining the second speech communication path between a terminal of the caiiing party and a terminal of the called party.

20. The method of claim 16, further comprising:
when the second speech communication path is established, determining whether an image communication mode is selected; and
when an image communication mode is selected, switching from a speech communication mode to the image communication mode.

21. The method of claim 16, said detecting of the key input, said receiving of the telephone number, said dialing of the telephone number, and said detecting whether the second speech communication path is established all being performed by a Web-phone system, the Web-phone system being connected to the Internet and to the telephone network.

22. The method of claim 21, said detecting of the key input being performed when the Web-phone system is in a call connection mode.

23. The method of claim 22, further comprising:
when the key input corresponds to the call forwarding command, detecting a type of line for the performance of the forwarding, said type of line being detected before said detecting of whether the telephone network is available.

24. A method of performing call forwarding between an Internet and a telephone network, comprising:
receiving an incoming call from a calling party to a called party, said receiving of the incoming call being performed by a Web-phone system connected to the Internet and to a telephone network when the Web-phone system is in a call non-connection mode;
determining whether the incoming call is to be forwarded;
when the incoming call is not to be forwarded, performing a standard call process;
when the incoming call is to be forwarded, detecting a type of line for the performance of the forwarding of the incoming call and detecting whether a telephone network is available;
when the telephone network is not available, transmitting a first error message;
when the telephone network is available, receiving a first telephone number of the called party from the calling party, dialing the first telephone number and detecting whether a first speech communication path is established;
when the first speech communication path is not established, transmitting a second error message;
when the first speech communication path is established, determining whether an image communication mode is selected;

when an image communication mode is selected, switching from speech communication mode to the image communication mode to maintain a first image communication path;

when the Web-phone system is in a call connection mode and an existing communication path is being maintained, detecting a key input;

determining whether the key input corresponds to a call forwarding command;

when the key input corresponds to the call forwarding command, detecting a type of line for the performance of the call forwarding command and detecting whether the telephone network is available;

when the telephone network is not available, transmitting a third error message;

when the telephone network is available, receiving a second telephone number, dialing the second telephone number, and detecting whether a new speech communication path is established;

when the new speech communication path is not established, transmitting a fourth error message; and when the new speech communication path is established, cutting off the existing communication path.

25. The method of claim 24, the existing communication path being established through the Internet.

26. The method of claim 24, said receiving of the second telephone number corresponding to receiving the second telephone number of the called party from the calling party.

27. The method of claim 26, the existing communication path being established through at least one network selected from among the Internet and the telephone network.

28. The method of claim 27, the incoming call being initially directed to one network selected from among the Internet and the telephone network.

29. The method of claim 24, the incoming call being initially directed to one network selected from among the Internet and the telephone network.

30. A method for performing external call forwarding between an Internet and telephone network, comprising:

receiving an incoming call by a Web-phone system connected to the Internet and to the telephone network;

determining whether the received incoming call is to be forwarded;

determiniing whether at least one additional condition is met; and when it is determined that the received incoming call is to be forwarded and that said at least one additional condition is met, requesting and receiving a telephone number of a called party from a calling party and using the received telephone number to forward the received incoming call to the called party, said received telephone number of the called party not having been included in the incoming call.

31. The method of claim 30, wherein said at least one additional condition comprises a determination that a telephone network is available.

32. The method of claim 30, wherein said at least one additional condition comprises a determination that a communication path is established.

33. The method of claim 30, wherein said at least one additional condition comprises a determination that a key input corresponding to a call forwarding command has been received.

34. The method of claim 30, wherein said at least one additional condition comprises a determination that an alternate communication path has been established.

35. The method of claim 30, wherein said at least one additional condition comprises a detection of a type of line for performance of the forwarding of the incoming call.

36. The method of claim 30, wherein said at least one additional condition comprises a determination that image communication has been selected.

* * * * *